Figures 5, 6:
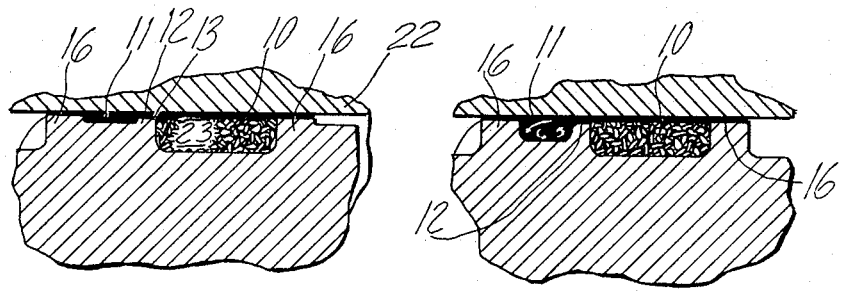

United States Patent
Barr

[15] 3,698,541
[45] Oct. 17, 1972

[54] EXTRUDER, OR EXTRUDER-LIKE MELTING APPARATUS

[72] Inventor: Robert Alan Barr, Warren, N.J.
[73] Assignee: Midland-Ross Corporation, Cleveland, Ohio
[22] Filed: Aug. 11, 1971
[21] Appl. No.: 171,021

Related U.S. Application Data

[63] Continuation-in-part of Ser. No. 799,430, Feb. 14, 1969, abandoned.

[52] U.S. Cl. ................. 198/214, 259/191, 425/208
[51] Int. Cl. ......................................... B65q 33/00
[58] Field of Search......... 425/200, 207, 208, 209, 376–378; 259/191; 198/214; 416/176, 177

[56] References Cited

UNITED STATES PATENTS

| 3,023,456 | 3/1962 | Palfey | 425/376 X |
| 3,271,819 | 9/1966 | Lacher | 259/191 |
| 3,358,327 | 12/1967 | Maillefer | 425/378 |
| 3,504,400 | 4/1970 | Natov et al. | 425/376 X |

FOREIGN PATENTS OR APPLICATIONS

| 420,581 | 3/1967 | Switzerland | 425/208 |

Primary Examiner—J. Spencer Overholser
Assistant Examiner—Michael O. Sutton
Attorney—Woodrow W. Portz et al.

[57] ABSTRACT

Apparatus, such as a screw type extruder, for reducing a solid thermoplastic particulate material to a fluid by continuous separation of the fluid component from the solid component of the material approximately as rapidly as formed.

3 Claims, 10 Drawing Figures

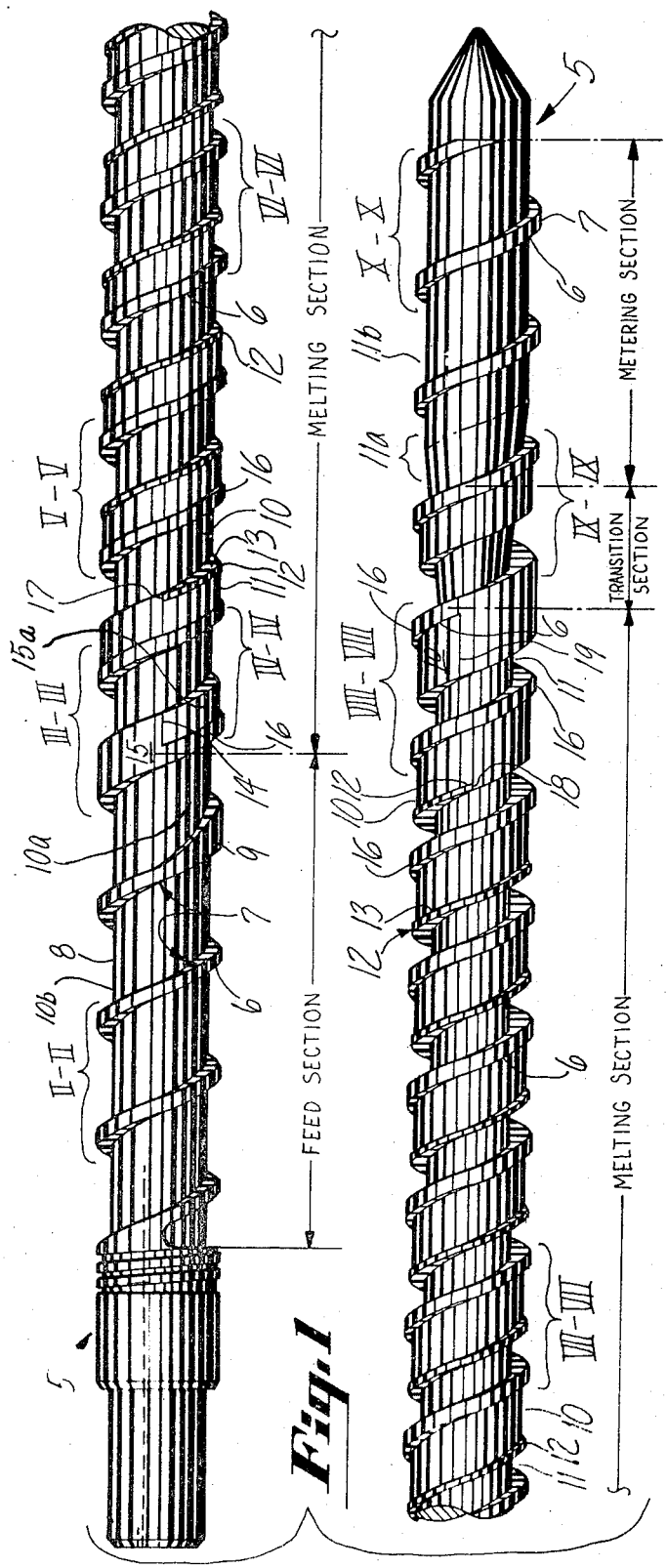
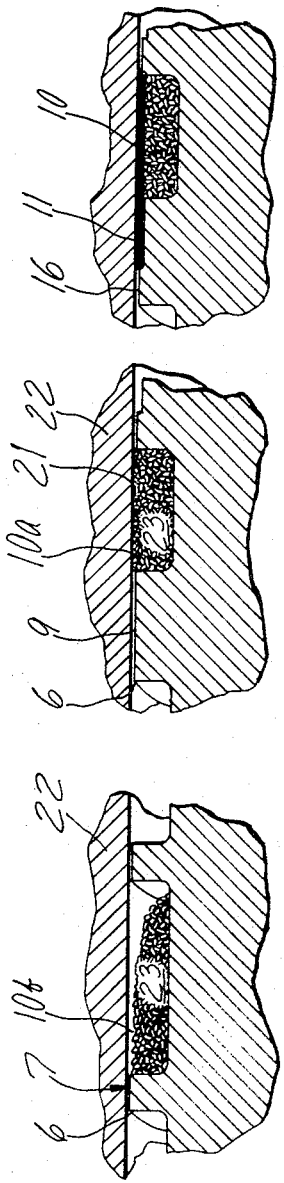

INVENTOR.
ROBERT A. BARR

EXTRUDER, OR EXTRUDER-LIKE MELTING APPARATUS

This application is a continuation-in-part of application Ser. No. 799,430 filed Feb. 14, 1969, and now abandoned.

The art of converting solid thermoplastic materials to a satisfactory fluid condition without overheating or chemical degradation in preparation for forming extruded articles is not fully developed. The present invention is based on new comprehensions respecting the conversion of solid thermoplastics to a fluid condition. For example, it is now better understood than heretofore as to the manner in which solid material may be melted by sliding contact with a heated surface. The knowledge gained is of particular use in the operation of a screw extruder wherein the inner surface of the barrel provides the heated surface with respect to which there is relative sliding movement of the meltable material. It is now understood, perhaps for the first time, that only a very thin film of melted material, e.g., not more than in the order of 0.010 inch to 0.015 inch, should be permitted in order to maximize heat transfer from the static supporting surface (barrel) of the bed of solid material and to maintain shear forces therebetween at a level which will induce a sufficient absorption of energy to create melting and rapid removal of melted material from the interface. It has been further found advantageous to maintain the solid bed virtually intact without substantial disruption during the entire procedure of melting the solid bed of material at its interface with the supporting surface. Such disruption occurs in conventional extruders wherein there is not adequate opportunity for the melted material to separate from the solid, or the channel is narrowed by reduction of thread pitch.

Melting of the solid material is found to be particularly inefficient when a condition is obtained in the extruder wherein lumps of solid material are suspended in a matrix of the melted material. On account of the circulatory flow path normally established in an extruder transversely of a screw channel, solid lumps move toward the center of the channel to become more resistant to melting. This condition frequently accounts for the issuing of irregularly melted material from an extruder which may be non-uniform in temperature and contain minute particles of unmelted material. As a result, the form and quality of the extruder product may be unsatisfactory.

Thus, it is an essential object of this invention to obtain more efficient and more uniform melting of thermoplastic materials during the preparation thereof for extrusion.

Objects ancillary to the foregoing object are to teach and define a method whereby that object may be accomplished and to provide apparatus capable of carrying out the method.

Another object is to provide method and apparatus for progressively melting solid thermoplastic material in such manner as to establish maximum heat transfer between a confining surface for the solid material and the material itself while constantly wiping away the melting material to the extent that only a very thin film of a desired thickness is permitted between the solid material and the confining surface.

A further object is to provide an extruder in conformity with the above-recited objects having a screw which is easy to manufacture, e.g., because of a uniform thread pitch.

It is another object to reduce power input and to reduce temperatures of the melted material separated from the solid material as a result of lower shear energy inputs in handling the separated melted material within a melt channel provided for carrying solely the melted material toward the discharge end of the extruder.

In accomplishing the above and other objects, the present invention resides in method and apparatus for transforming a thermoplastic solid particulate material to a fluid free from particles and variations in temperature entailing propelling a steady stream of the initially particulate material along a path with a portion of the outer surface of substantially the entire length of the stream in contact with a relatively static surface in heat exchange relation with the material. As a preferred apparatus, conversion to a fluid may be accomplished with a screw type extruder constructed in accordance with the invention. As the material progresses through the treatment region, it is first passed through a feed section in which the path is gradually constricted to pack the particulate material. Then the material passes into a melting section characterized by two subpaths or subchannels of which one receives the particulate material from the feed section and diminishes in cross section toward the discharge end of the melting section by diminishing in depth to approximately zero value. Within the melting section, a second subpath in liquid-receiving coextensive relation with the first subpath extends through the melting section in gradually increasing cross section, increasing preferably by depth, in accordance with the rate of melting of material occurring in the first subpath. Transfer of melted material from the first subpath to the second is accomplished by the wiping of melted material from the compacted particulate material by relative movement of structure defining the subpaths with the supporting surface. The subpaths are separated in such a manner as to prevent passage of solid material into the second subpath but to enable free flow of melted material thereinto.

The second subpath is contiguous with a final or metering path portion by which the completely melted material may be discharged in a uniform manner from the processing region.

In the drawing with respect to which the invention is described:

FIG. 1 is a broken longitudinal view of the screw of an extruder on which the invention is based; and FIG. 2 to 10 are diagrammatic section views taken along longitudinal axial planes of the screw of FIG. 1 including also an adjacent portion of an extruder barrel.

The drawing depicts a single embodiment of apparatus exemplary of that which may be used to practice the method of this invention. Details of extruder barrel structure and screw-driving mechanism are not illustrated or described herein since they may be of entirely conventional design and are not a part of the present invention except insofar as the extruder barrel provides a suitable housing in close clearance with the thread of the screw 5. The longitudinal portions of the screw sought to be illustrated by the various FIGS. 2 – 10, respectively, are indicated in FIG. 1 by brackets II—II, III—III, etc. It will be noted that the length of the screw divides into feed, melting, transition, and metering sections named in the order of sequence occurring in the direction of material flow through the extruder, and that the barrel is in close concentric relation with the trailing edge 6 of the thread 7 throughout the length of the extruder. In a typical screw in accordance with the invention, the core 8 of the screw is of uniform diameter throughout a length corresponding to several turns of the thread 7 forming a channel 10b to provide a somewhat metered material input to the extruder. At the discharge end of the feed section, it will be noted that the thread 7 progressively widens at 9 in FIG. 1 and in a manner indicated to some extent by comparing FIGS. 2 and 3. The wider part of the thread extending as shown in the drawing through the melting section then forms a narrowed channel portion 10a for compacting the pelletized or particulate thermoplastic feed material.

As the drawing shows, there is no substantial change of core radius along the bottom of each channel as channel 10b forms a junction through channel region 10a with channel 10. Thus, there is a reduction of channel cross section (channel region 10a) in proceeding through the junction from channel 10b to channel 10 which corresponds in an approximate way to, and results from, the increase in the width of the thread 7 adjacent the junction of channels 10b and 10a.

FIG. 1 is illustrative of a screw having a thread of which its basic structure may be traced at uniform pitch throughout the entire length of the screw. Uniform pitch is established along the trailing edge 6 of all flights of the thread throughout the length of the screw.

Figures 7, 8:
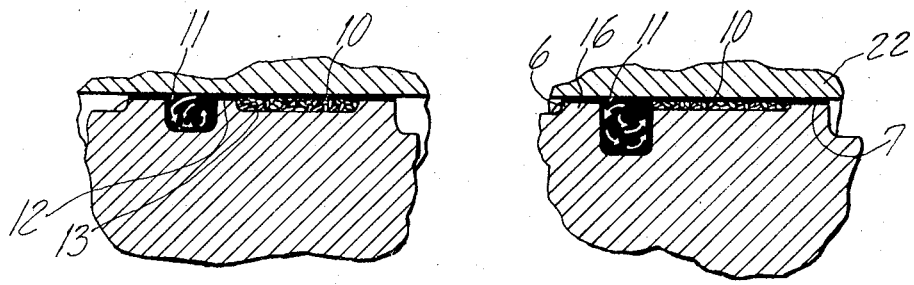

FIG. 1 indicates that the melting section constitutes a major portion of the length of the material processing mechanism of the extruder. In an approximate manner, the melting section comprises the portion of the screw defining a solids-carrying subchannel or primary channel 10 contiguous with channel 10b in the feed section, and a fluids-receiving subchannel or secondary channel 11 separated from subchannel 10 by a secondary thread or threadlike dam 12. The basic thread 7 may be regarded as divided by a recess throughout the melting section into two portions to form the secondary channel 11 with the leading edge 13 of the dam 12 being the leading edge of the basic thread and substantially uniformly distant from the trailing edge 6. Looking left to right in FIG. 1, i.e., in the direction of material transfer, the subchannel 11 begins at 14 as a radially undercut area 15a on the widened thread part of gradual and slight reduction in radius from the full-radius thread surface at 15. Since the secondary thread or dam 12 is lower, or of less radius, than the trailing full-radius thread portion 16, the beginning terminus of the dam 12 does not appear along area 15a until point 17 is reached along the gradually deepening subchannel 11. At point 17 the dam 12 and the subchannel 11 are approximately of the same radius. Thereafter, the outer periphery of the dam 12 is constant and the radius of the bottom surface of the subchannel 11 gradually decreases to a minimum radius at the end of the melting section as shown in FIG. 7. As shown in FIG. 1, the dam 12 disappears at point 18 as its outer surface becomes flush with the bottom surface of the subchannel 10. Subchannel 10 becomes smaller in cross section as its radius gradually increases thereafter until its bottom surface becomes flush with the trailing edge 6 or thread section 16 adjacent the terminal line 19 of the subchannel 10. The longitudinally corresponding portion of the subchannel 11 at this point along the screw 5 has reached its maximum depth or minimum radius.

Because of the beginning of the secondary channel 11 at the full thread radius at points 14 and the termination of the primary channel at the full thread radius at point 19, and because the dam 12 is of less radius than the full-radius thread portion 16, the dam 12 is shorter than the full radius thread portion. The length of the dam is thus located between the ends of the full-radius thread portion. From FIG. 1, it is observable that the dam 12 begins in an area of the secondary channel adjacently downstream from the upstream terminus of the channel and ends in an area of the primary channel adjacently upstream from the downstream terminus of the primary channel. The full-radius thread portion 16, on the other hand, begins at the same point as the upstream end of the secondary channel and ends downstream at the same point as the primary channel 10.

In view of the foregoing and an examination of successive turns of the screw 5 as illustrated in FIG. 1 beginning with the beginning terminus 14 of the "-secondary" channel, it will be noted in successive turns that the secondary channel 11 progressively deepens at a substantially uniformly gradual reduction in radius of the core therealong. In a like manner, the primary channel 10 becomes shallower by a gradual and substantially uniform increase in radius of the core therealong. The depth of respective channels just referred to are characterized by very gradual and uniform transition from insignificance to maximum depths of respective channels.

In a typical embodiment of the invention, the ratio of the length over diameter of the material-processing region of the barrel may be approximately 20 to 1 with the barrel inside diameter being 4.500 inches. The outside and maximum diameter of the thread 7 along its trailing edge 6 is 4.490 inches. The O.D. of the secondary thread or dam 12 is approximately 4.430 inches. The width of solids-carrying subchannel 10 may, e.g., be approximately 2.25 inches throughout its entire length, the maximum diameter trailing thread portion 16 is approximately 7/16 inch. The dam 12 has a width, e.g., in the range 1/6 to ¼ of an inch. The melt subchannel 11 has a width in the range of 1 inch to 1¼ inch. The channel of the feed section of such a screw has in practice been cut to a depth of 0.67 inch with this depth being continued into the solids-carrying subchannel 10 contiguous therewith and decreasing to zero depth at extremity 19 of the channel 10. The liquids-receiving channel 11, on the other hand, has been shaped in such an example to vary in depth from zero at the extremity 14 to one inch adjacent the extremity 19 of the solids-carrying subchannel 10.

Figures 9, 10:
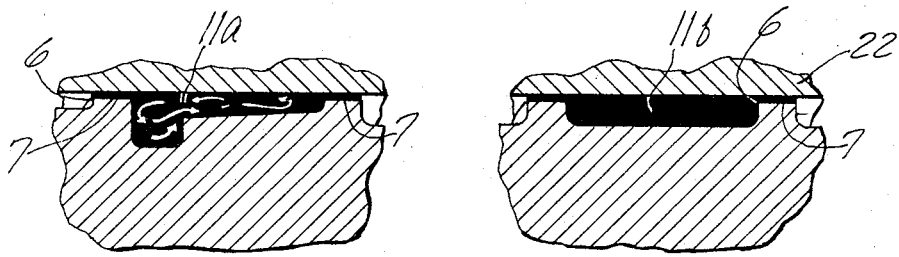

The problem of joining the melting section with the metering section is purely one of reshaping the deeply cut melt-carrying channel 11 to join with the shallow metering-section channel 11b. That is to say, the discharge extremity of channel 11 must in a turn or two about the axis of the screw become shallower and wider to conform with the cross section of the channel as shown in FIG. 10. FIG. 9 illustrates one radial plane along this transition section which in comparison to FIG. 8, which illustrates subchannels 10 and 11 near the discharge end of the melt section, shows considerable reduction of depth and increase in width in a transitional channel portion 11a in partial transition to the metering section channel 11b. FIG. 8 shows that channel 10 has reached such shallowness that the radius of its bottom surface exceeds that of the dam 12 and the latter has disappeared.

In operation, a particulate thermoplastic material, such as polyvinyl chloride pellets, is fed into the feed section of the extruder depicted in FIGS. 1 and 2 and conveyed without melting, somewhat as shown in FIG. 2, into channel region 10a of FIG. 3 narrowed by widening of the thread 7 along area 9. As shown in FIG. 1, the area 9 of widening of the thread and corresponding narrowing in the feed channel extends through approximately one turn of the thread. The narrowed channel compacts the solid material and causes pressure which forces the material against the inner surface 21 of the barrel 22. The wall of the barrel is heated by conventional means, such as electrical strip heaters or jackets within the barrel wall for conducting a heated fluid. In most cases, the particulate material 23 will approach or attain melting temperature in the region of 10a along the barrel surface, i.e., the interface of the barrel and the material 23. With the extruder adjusted to proper operating conditions of heat transfer, feed regulation and speed of screw rotation, sufficient melting of material has occurred as the particulate material in subchannel 10 reaches the region of FIG. 4 to permit some separation of melted material, referred to hereinafter as "fluid", to collect in the very shallow beginning portion of subchannel 11. Subchannel 11 gradually deepens while retaining substantially its initial width as defined between the dam 12 and the thread portion 16. As pointed out hereinbefore, liquid formed at the interface of the melted material 23 with the barrel is easily transferred to subchannel 11 because of the greater clearance of the dam with the barrel than the full-radius thread portion 16.

However, it is an important objective in practicing the present invention to maintain the unmelted material 23 substantially intact throughout the length of the subchannel 10 with reduction of its mass occurring only as it melts and is carried away at the interface. It is thus important to maintain the subchannel 10 at approximately the same width throughout its length. FIGS. 5, 6, 7 and 8 illustrate that the subchannel 10 of uniform width gradually decreases in depth while the liquids-receiving subchannel 11 increases in depth.

As material reaches the section shown in FIG. 8, complete melting has been accomplished and the processed material is substantially in condition for extrusion. The extruder conventionally comprises a metering section typified by FIG. 10 and the extreme right portion of FIG. 1 (lower part) to create a back pressure throughout the length of the extruder which assures a uniform discharge rate and avoidance of voids throughout the extruder length, and to effect final stage mixing and conditioning.

An extruder in accordance with the foregoing description assures the orderly separation of melted material from unmelted material and, as a result of such separation, promotes more efficient contact of the unmelted material with the barrel surface to achieve extremely effective heat transfer rates from the barrel to the unmelted material and to establish and maintain heat generation by high shear forces characteristic of a condition wherein a solid is propelled over a surface while forced thereagainst at substantial pressure.

To some extent, such pressure exerts squeezing action on the melted material which supplements the frictional drag for moving melted material away from the interface of the barrel and the material contained in primary channel 10 of the melting section. As a necessary part of the arrangement described herein, the present invention further provides a region, the secondary channel 11, to which melted material may escape partly by pressure-drop and partly by frictional propulsion over the solids-retaining dam 12.

Such structure causes melted material remaining between the barrel surface and the solid material to be reduced to a film of extreme thinness which promotes the transmission of heat from the barrel into the solids and the generation of heat by exertion of shear forces at the interface of the material and the inner barrel surface. The melted material is thus separated from the solids and collected in the secondary channel 11 wherein the shear forces are relatively low and the heat generation is substantially less than in the primary channel 10. An extruder operating in accordance with these principles endeavors to utilize thermal energy in the melting and mixing of the solid particulate thermoplastic material without excessive generation of heat and overheating in the melted material in a more efficient manner than heretofore known.

While the fluid-collecting subchannel 11b has been described above in a general way as increasing in cross section to the extent that the solids-carrying or primary channel 10 decreases in cross section to enable the extruder to function in the usual way as a conveyor of the melted material, it has been discovered that benefits may be derived from screw construction in which the fluid-collecting or secondary channel 11b, while increasing in size as adjacent portions of the solids-carrying channel decrease in cross section, may be "under-sized" with respect to the solids-carrying channel. That is, the melt-collecting channel 11b is substantially smaller, e.g., by 20 percent or more, in cross section at any point along the melting section of the screw than a cross sectional area value equal to the reduction in cross section of the solids-carrying channel through the melting section as measured at any such point with reference to the entry end of the melting section. It has been discovered that the hydraulic pressure of the melt as it leaves the interface of the extruder barrel and the solid material of channel 19 is ample to propel or "squirt" the melt through the channel 11b toward the end of extruder at a linear rate greater than that which would be obtained by the normal pumping action of the screw. When the melt-conducting subchannel is of "under-sized" cross section, especially if it is narrow, the solids-carrying channel may be comparatively wider with the benefit that the barrel transmits more heat into the solids-carrying or primary channel 10 and less to the melt-conducting or secondary channel 11b. The melted material receives less heat from the barrel because of (1) the reduced interface area, and (2) the increased rate of passage; hence, less residence time within the extruder melting section. Furthermore, in avoiding the overheating of heat-sensitive materials, it is possible in this manner to minimize another source of overheating the melt, i.e., some of shearing action and mechanical energy input into the melting material that is produced in conventional screw operation.

The description above refers primarily to a preferred embodiment. It will be recognized that the feed section and the metering section, while cooperating with the melting section to enhance its function, are of conventional construction. The invention also takes into account that the feed section may achieve compacting of unmelted pellets and the like by having a channel of the same width as the solids-carrying channel 10 of the melting section but of decreasing depth in the direction of load transfer with successive flights separated by wide raised thread portions as found in FIG. 9. Conceivably, other apparatus configurations for supplying solid material to, and receiving melted material from, the melting section are possible while achieving satisfactory melting in a device having a melting section constructed as taught herein. Hence, the present invention is centered essentially in the melting section of the screw 5.

What is claimed is:

1. An extruder screw comprising a core and a thread thereon having a trailing edge and a leading edge with one of said edges conforming to a substantially uniform pitch throughout the length of the screw, said thread and said core defining a feed section and melting section and a metering section;

said thread and core being shaped to define a first channel through said feed section and a second channel through said metering section, and a primary channel and a secondary channel extending coextensively through said melting section, said primary channel being of uniform width, contiguous with said first channel, and progressively decreasing in cross section to insignificance in said melting section by decrease in depth as measured in the radial direction of the screw;

said thread having a wider part extending from the junction of the first channel and the primary channel and throughout the melting section, said primary channel being correspondingly reduced in width and cross section at said junction relative to said first channel;

said secondary channel being defined by a recess in said wider part extending substantially the full length of the melting section, said secondary channel merging with said second channel and progressively increasing from insignificance to a cross section to at least that of said second channel;

said recess dividing said wider part of the thread into a full-radius portion along the trailing edge and a thread-like dam along the leading edge of the thread at less radius than said full-radius portion, said secondary channel beginning at full thread radius and extending progressively at substantially uniformly gradual reduction in radius in accordance with increase in core radius adjacently within the primary channel, said primary channel gradually and substantially uniformly increasing in radius to its downstream end to the full radius of the thread;

said dam being shorter than said full-radius thread portion with its length located between the ends of the full-radius thread portion, said dam beginning in an area of the secondary channel adjacently downstream from its upstream terminus at a point where the radius of the secondary channel has decreased to that of the dam and ending in an area of the primary channel adjacently upstream from its downstream terminus at a point where the radius of the primary channel has increased to that of the dam.

2. The extruder of claim 1 wherein:

the widening of said thread adjacent said channel junction occurs through approximately one turn of the thread.

3. The extruder screw of claim 1 wherein:

the cross section of said secondary channel is substantially less at any point along said melting section than a value equal to the reduction in cross section along said melting section of said primary channel as measured at said any point to effect forwarding of melted material through the secondary channel by hydraulic pressure at substantially greater rates than by normal pumping action of the screw thread.

* * * * *